United States Patent [19]
Mori

[11] Patent Number: 5,457,553
[45] Date of Patent: Oct. 10, 1995

[54] THIN-FILM TRANSISTOR PANEL WITH REDUCED NUMBER OF CAPACITOR LINES

[75] Inventor: Hisatoshi Mori, Hachioji, Japan

[73] Assignee: Casio Computer Co., Ltd., Tokyo, Japan

[21] Appl. No.: 336,015

[22] Filed: Nov. 8, 1994

Related U.S. Application Data

[63] Continuation of Ser. No. 994,141, Dec. 21, 1992, abandoned.

[30] Foreign Application Priority Data

Dec. 25, 1991 [JP] Japan .................................. 3-356523
Dec. 25, 1991 [JP] Japan .................................. 3-356525

[51] Int. Cl.$^6$ ................................................ G02F 1/1343
[52] U.S. Cl. ................................................ 359/59; 359/54
[58] Field of Search .................... 359/58, 59, 54, 359/87; 340/784, 719; 345/93

[56] References Cited

U.S. PATENT DOCUMENTS 5,159,476  10/1992  Hayashi ........................................ 359/59
5,193,017   3/1993  Iwai et al. .................................. 359/59
5,247,289   9/1993  Matsueda ..................................... 359/59

FOREIGN PATENT DOCUMENTS 3-259223  11/1991  Japan ........................................ 359/59

*Primary Examiner*—William L. Sikes
*Assistant Examiner*—Huy Mai
*Attorney, Agent, or Firm*—Frishauf, Holtz, Goodman, Langer & Chick

[57] ABSTRACT

A TFT panel comprises a transparent substrate made of glass, a plurality of transparent pixel electrodes arranged in a matrix on the transparent substrate, thin-film transistors (TFTs) respectively connected to the pixel electrodes, gate lines respectively connected to the gate electrodes of the TFTs arranged in a column direction of the matrix, data lines respectively connected to drain electrodes of the TFTs arranged in a line direction of the matrix, and capacitor lines for forming storage capacitors. One capacitor line is arranged so as to overlap two adjacent pixel electrodes with an insulating film interposed between the capacitor line and the adjacent pixel electrodes. Two gate lines are interposed between pairs of pixel electrode columns adjacent to each other. The gate electrodes of the TFTs of a pixel electrode column are connected to the gate line adjacent to the pixel electrode column.

9 Claims, 4 Drawing Sheets

5,457,553

THIN-FILM TRANSISTOR PANEL WITH REDUCED NUMBER OF CAPACITOR LINES

This application is a Continuation, of application Ser. No. 07/994,141, filed Dec. 21, 1992, now abandoned.

BACKGROUND OF THE INVENTION

1. Field of the Invention

The present invention relates to a thin-film transistor panel for use in an active matrix liquid crystal display element.

2. Description of the Related Art

A thin-film transistor panel (herein after referred to a TFT panel) for use in an active matrix liquid crystal display element comprises a plurality of gate lines and a plurality of data lines formed on a transparent substrate made of glass or the like, a plurality of thin-film transistors arranged at intersections of the lines, and pixel electrodes arranged in a matrix, respectively connected to the thin-film transistors. The thin-film transistors are of inverse stagger type.

FIG. 6 shows a portion of the above-described conventional TFT panel and FIG. 7 shows an electrical equivalent circuit thereof.

The TFT panel comprises a plurality of transparent pixel electrodes 2 arranged in row and column directions, a plurality of thin-film transistors 3 respectively connected to the pixel electrodes 2, and a plurality of gate lines G and data lines D connected to the thin-film transistors 3. Each gate line G is interposed between adjacent pixel electrode columns and each data line D is interposed between adjacent pixel electrode rows.

Each of the thin film transistors 3 comprises a gate electrode Ga connected to the gate line G formed on the substrate 1, a gate-insulating film 4 which covers the gate electrode, a semiconductor layer 5 formed on the gate-insulating film 4, and source and drain electrodes Sa and Da formed on the semiconductor layer 5. The gate-insulating film 4 of the thin-film transistor 3 is formed to cover the gate lines G substantially entirely over the substrate 1.

The pixel electrode 2 and the data line D are formed on the gate-insulating film (transparent film) 4. The source electrode Sa of the thin-film transistor 3 is connected to the pixel electrode 2 and the drain electrode Da to the data line D.

The TFT panel is adhered by a frame-like sealing material to an opposite panel (not shown), which is obtained by forming an opposite electrode (transparent electrode) on a transparent substrate and orientating the electrode. Liquid crystal is injected between the two panels, thereby producing an active matrix liquid crystal display element.

In the active matrix liquid crystal display element, each pixel electrode 2 in the TFT panel has a storage capacitor Ca in order to suppress the variation of potential maintained by the pixel electrode 2 in a non-selection period.

In FIGS. 6 and 7, a reference symbol C denotes a capacitor line which constitutes the storage capacitor Ca. The capacitor line C is formed on the substrate 1 (under the gate-insulating film 4), so as to face one side of the pixel electrode of each line and extend in parallel with the gate line G.

The storage capacitor Ca is formed of the capacitor line C, the pixel electrode 2 and the gate-insulating film 4 interposed therebetween. It stores charges applied to the pixel electrode 2 during a selection period (when the thin-film transistor 3 is in an ON state). By virtue of the storage capacitor Ca, the potential in the pixel electrode 2 in the non-selection period is maintained. The capacitor line C is connected to a reference potential (ground potential).

The above-described TFT panel is, however, disadvantageous in that a number of lines must be used. More specifically, capacitor lines C of a number which coincides with the number of the pixel electrode columns are required, since one capacitor line C is provided in one pixel electrode column.

SUMMARY OF THE INVENTION

It is accordingly an object of the present invention to provide a TFT panel in which the number of the capacitor lines is substantially half the number of the pixel electrode columns, thereby decreasing the number of the lines.

To achieve the above object, a TFT panel according to an aspect of the present invention comprises pixel electrodes and TFTs arranged in a matrix, wherein one capacitor line overlaps two adjacent pixel electrodes so that storage capacitors are formed between the capacitor line and the pixel electrodes.

A TFT panel according to another aspect of the present invention comprises pixel electrodes and TFTs arranged in a matrix, wherein one capacitor line overlaps two adjacent pixel electrodes, and two gate lines are interposed between two adjacent pixel electrode columns and each gate line is connected to the gate electrodes of the TFTs adjacent to the gate line.

A TFT panel according to still another aspect of the present invention comprises pixel electrodes and TFTs arranged in a matrix, wherein one capacitor line overlaps two adjacent pixel electrodes, one gate line is interposed between two adjacent pixel electrode columns and connected to the gate electrodes of the TFTs of the pixel electrode columns, and the drains of the TFTs of one line of the pixel electrodes are alternately connected to data lines on either side of the line.

According to the present invention, since one capacitor line is provided for two adjacent pixel electrodes, the capacitor line can be used for the storage capacitors connected to the two pixel electrodes of two columns. Therefore, the number of the capacitor lines is substantially half the number of the pixel columns, resulting in a TFT panel having a small number of lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

First Embodiment

Figure 1:
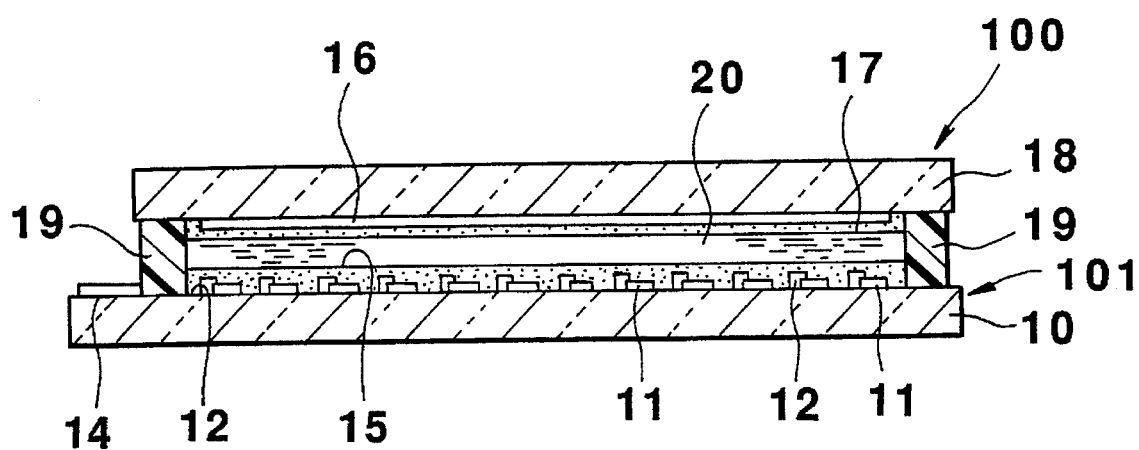
FIG. 1 is a cross sectional view of an active matrix liquid crystal display element in which a TFT panel of the present invention is used.
Figure 2:
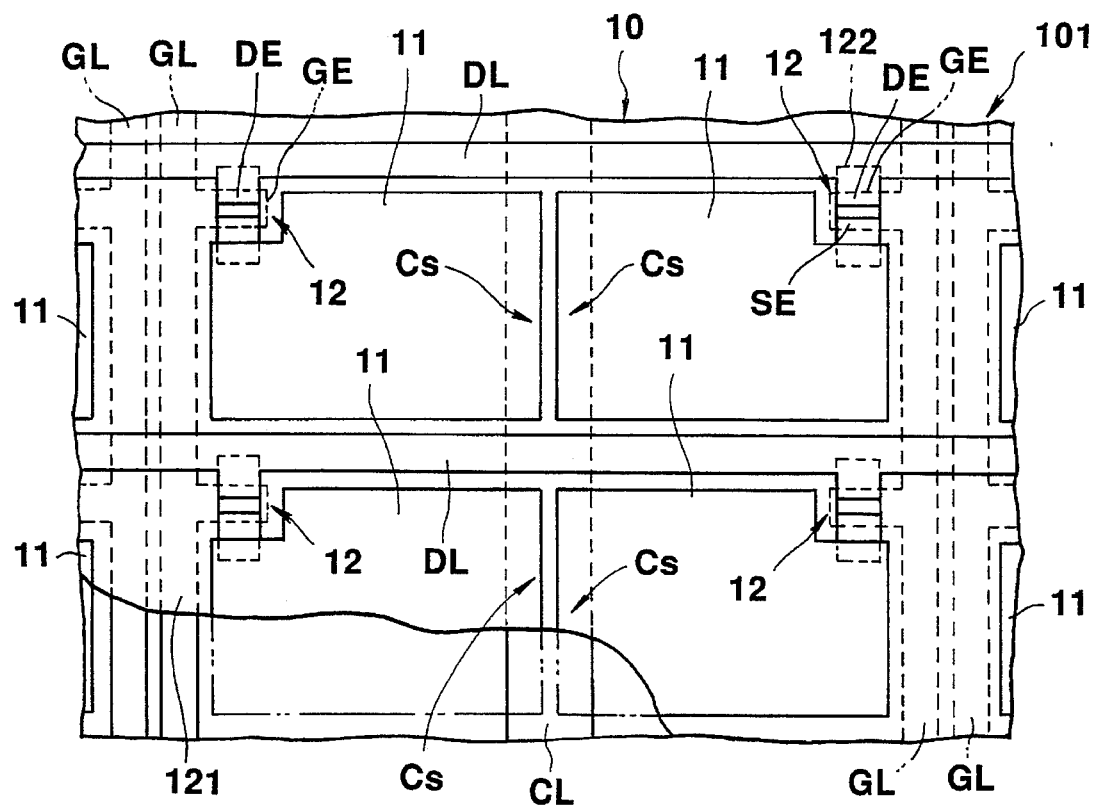
FIG. 2 is an enlarged plan view of a portion of a TFT panel according to a first embodiment of the present invention.
Figure 3:
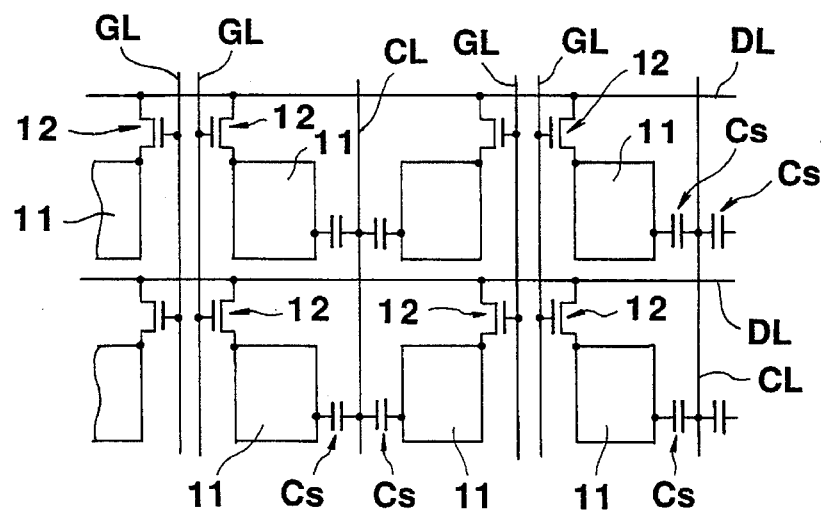
FIG. 3 is an equivalent circuit diagram showing the electrical arrangement of the portion shown in FIG. 2.

A TFT panel according to a first embodiment of the present invention and an active matrix liquid crystal display element employing the TFT panel will be described with reference to FIGS. 1 to 3. FIG. 1 is a cross sectional view of the active matrix liquid crystal display element, FIG. 2 an enlarged view of a portion of the TFT panel, and FIG. 3 an electrical equivalent circuit of the structure shown in FIG. 2.

A TFT panel 101 comprises a transparent substrate 10 made of glass or the like, a plurality of transparent pixel electrodes 11 arranged in a matrix, and a plurality of thin-film transistors (TFTs) 12 respectively connected to the pixel electrodes 11, a plurality of gate lines GL, a plurality of date lines DL, and terminals 14 of the gate lines GL. The gate lines GL are arranged in column of the matrix and connected in common to electrodes GE of TFTs 12. The data lines DL are arranged in row of the matrix and are connected in common to the drain electrodes DE of TFTs 12.

In the TFT panel 101, an orientation film 15 is formed in a display region in which the pixel electrodes 11 are arranged. A transparent opposite substrate 18 on which a transparent opposite electrode 16 and an orientation film 17 are formed is faced to the TFT panel 101. The opposite substrate 18 and the TFT panel 101 are adhered to each other by a sealing material 19 positioned therebetween. Liquid crystal 20 is sealed between the substrate 18 and the TFT panel 101, thereby forming a liquid crystal display element 100.

The thin-film transistor 12 comprises a gate electrode GE connected to the gate line GL formed on the substrate 10, a gate-insulating film 121 covering the gate electrode GE, a semiconductor layer formed on the gate-insulating film 121, a source electrode SE and a drain electrode DE formed on the semiconductor layer.

In the active matrix liquid crystal display element, each pixel electrode 11 has a storage capacitor Cs in order to suppress the variation of potential maintained by the pixel electrode 11 in a non-selection period. The storage capacitor Cs includes a capacitor line CL formed on the substrate 10 and that portion of the pixel electrode 11 which faces the capacitor line CL with the gate insulating film 121 interposed therebetween.

In one line of the TFT panel, two (first and second) gate lines GL are arranged in parallel between pairs of two (first and second) adjacent columns of the pixel electrodes 11, with no gate line interposed between the pixel electrode columns of one pair.

The thin-film transistors 12 connected to of the two (first and second) pixel electrodes 11 of one paired columns are located on the sides opposite of the pixel electrodes to the sides which face each other. The gate electrode GE of the first thin-film transistor 12 whose source electrode SE is connected to the first pixel electrode 11 is formed on the first gate line GL which is adjacent to the first pixel electrode 11. The gate electrode of the second thin-film transistor 12 whose source electrode SE is connected to the second pixel electrode 11 is formed on the gate line GL which is adjacent to the second pixel electrode 11.

The capacitor line CL extends between the first and second columns of the pixel electrodes. The capacitor line CL is wide enough to overlap the portions of both pixel electrodes positioned on both sides. The storage capacitor Cs for the first pixel electrode is formed between a side portion of the first pixel electrode and a near-half portion of the capacitor line CL. The storage capacitor Cs for the second pixel electrode is formed between a side portion of the second pixel electrode and the other near-half portion of the capacitor line CL.

In the above embodiment, the width of the capacitor line CL is substantially twice that of the conventional TFT panel, so that the area in which the capacitor line CL faces each pixel electrode is substantially the same as that in the conventional TFT panel. Thus, the storage capacitor Cs for each pixel electrode has a capacity substantially the same as that of the storage capacitor of the conventional TFT panel.

In the TFT panel as described above, two gate lines GL are arranged in parallel between pairs of pixel electrodes (first and second pixel electrodes) 11 in one line. The first thin-film transistor 12 of the first pixel electrodes 11 is connected to the gate line GL adjacent to the first pixel electrode 11 and the second thin-film transistor 12 of the second pixel electrode 11 is connected to the gate line GL adjacent to the second pixel electrode. Thus, the first and second pixel electrodes are adjacent to each other with no gate line interposed therebetween. Further, the capacitor line CL overlaps the first and second pixel electrodes 11 and the storage capacitors Cs are formed between the capacitor line CL and the pixel electrodes 11. In this structure, one capacitor line CL is common to the storage capacitors Cs of the two pixel electrodes 11.

Therefore, according to the above embodiment, the number of the capacitor lines required to respectively provide storage capacitors for pixel electrodes 11 is a half of the number of the pixel electrode columns (if the TFT panel has an even number of pixel electrode columns, or one plus a half of the number of the pixel electrode columns (if the TFT panel has an odd number of pixel electrode columns). Thus, capacitor lines substantially half as many as the pixel electrode columns suffice to respectively provide storage capacitors for every pixel electrode 11.

Second Embodiment

Figure 4:
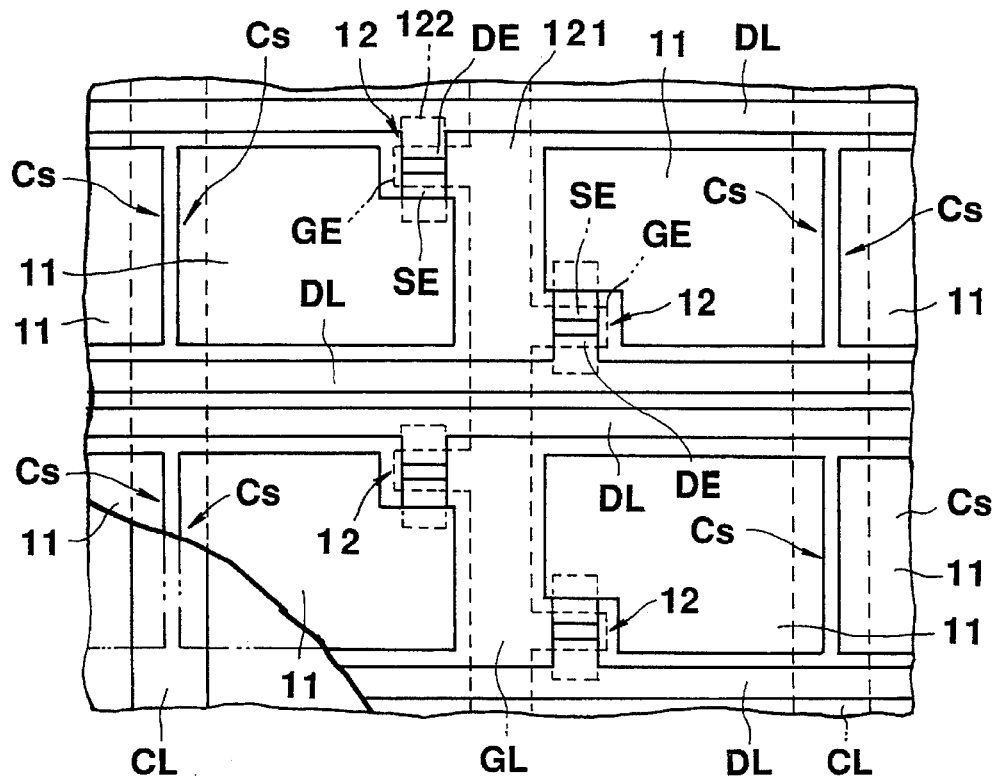
FIG. 4 is an enlarged plan view of a portion of a TFT panel according to a second embodiment of the present invention.
Figure 5:
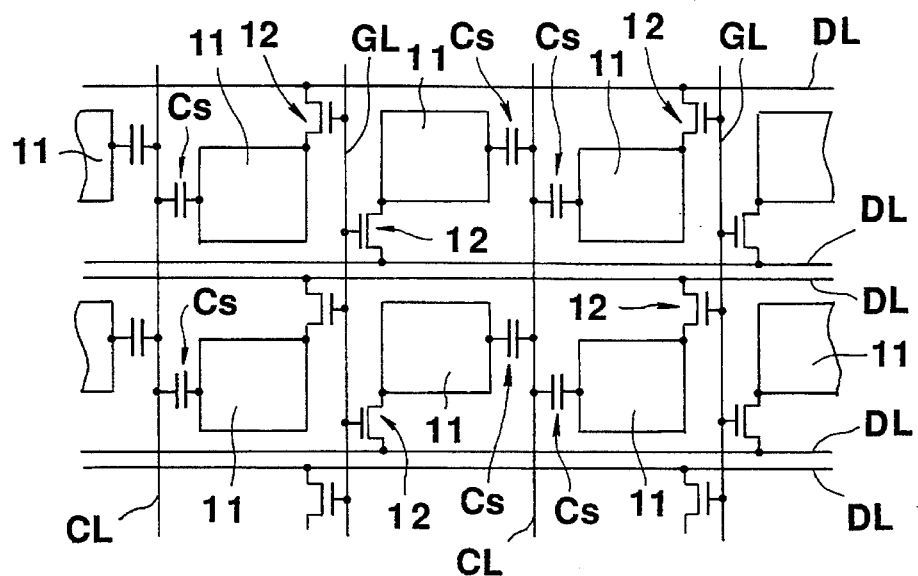
FIG. 5 is an equivalent circuit diagram showing the electrical arrangement of the portion shown in FIG. 4.
Figure 6:
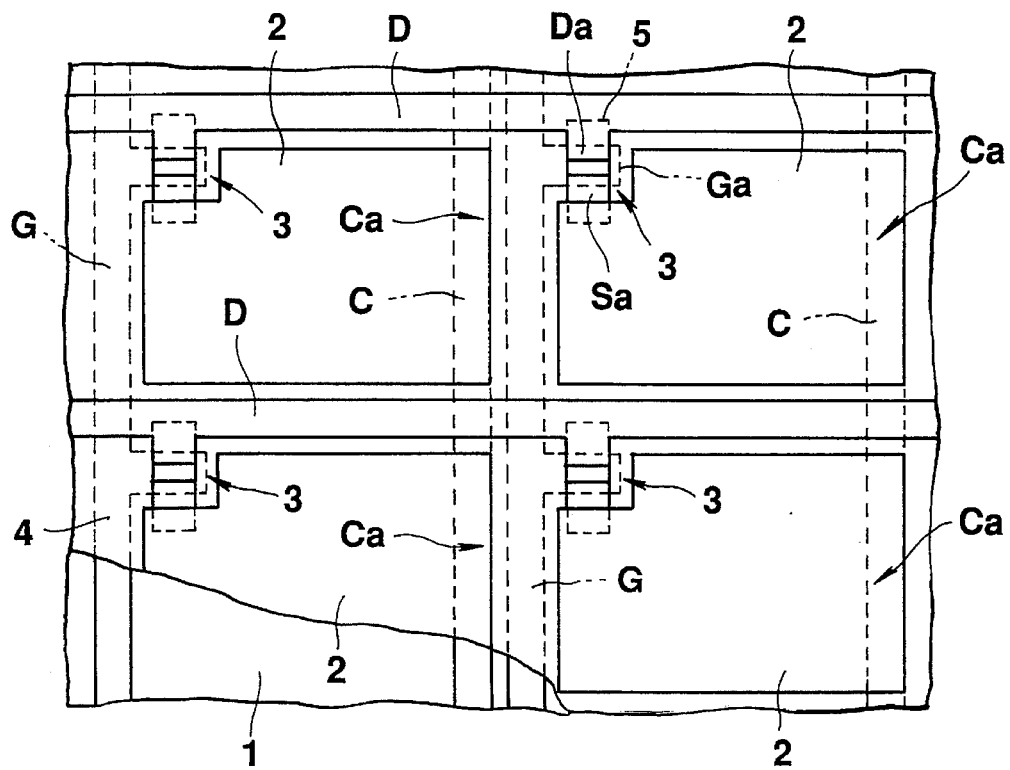
FIG. 6 is a plan view of a portion of the conventional TFT panel.
Figure 7:
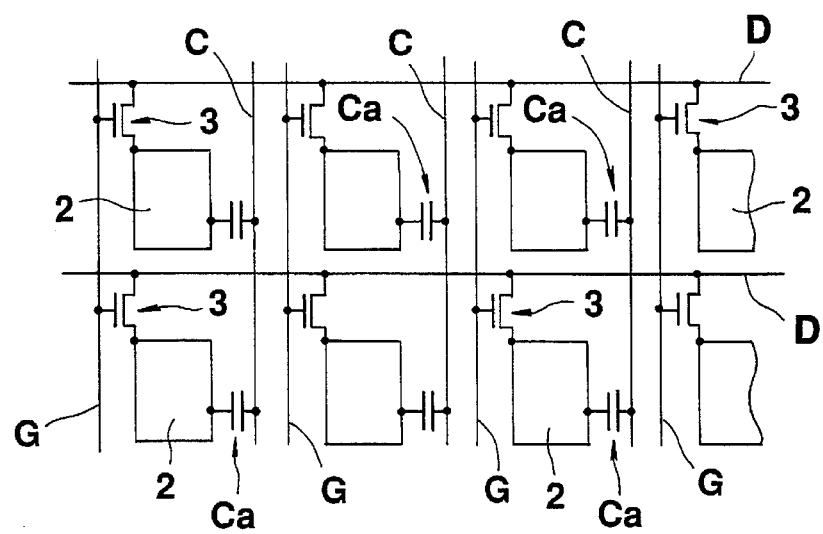
FIG. 7 is an equivalent circuit diagram showing the electrical arrangement of the portion shown in FIG. 6.

A second embodiment will now be described with reference to FIGS. 4 and 5. The members like those in the first embodiment are identified with like reference numerals, and descriptions thereof are omitted.

In this embodiment, a gate line GL is arranged between pairs of adjacent pixel electrodes 11 in one line, with no gate line GL interposed between the adjacent pixel electrodes of one pair.

The gate line GL serves as a common line for supplying a gate signal to the first thin-film transistor 12 of a first pixel electrode 11 on one side thereof and the second thin-film transistor 12 of a second pixel electrode 11 on the other side thereof.

Each of the pixel electrodes 11 on both sides of the gate line GL has a thin-film transistor 12 on the side which faces the gate line GL. The first and second groups of the transistors 12 are arranged at different positions in a longitudinal direction of the gate line GL. The gate electrode GE of the first thin-film transistor 12 whose source electrode SE is connected to the first pixel electrode 11 is formed on a first side of the gate line GL. The gate electrode of the second thin-film transistor 12 whose source electrode SE is connected to the second pixel electrode 11 is formed on a second side of the gate line GL.

Two data lines DL are arranged between two adjacent pixel electrode rows. With regard to the thin-film transistors 12 connected to one gate line GL, the drain electrode DE of the thin-film transistor 12 of the pixel electrode 11 on the first side of the gate line GL is connected to the data line DL adjacent to one side of the pixel electrode row. The drain electrode DE of the thin-film transistor 12 of the pixel electrode 11 on the second side of the gate line GL is connected to the data line DL adjacent to the other side of the pixel electrode row.

The capacitor line CL extends between adjacent pixel electrodes. The capacitor line CL is wide enough to overlap the side portions of the adjacent pixel electrodes. The storage capacitor Cs of one of the pixel electrodes is formed between a side portion of the pixel electrode and near-half portion of the capacitor line CL. The storage capacitor Cs of the other pixel electrode is formed between a side portion of the pixel electrode and the other near-half portion of the capacitor line CL.

In the above embodiment, the width of the capacitor line CL is substantially twice that of the conventional TFT panel. The area in which the capacitor line CL faces each pixel electrode 11 is substantially the same as that in the conventional TFT panel. Thus, the storage capacitor Cs of each pixel electrode has a capacity substantially the same as that of the storage capacitor of the conventional TFT panel.

In the TFT panel as described above, a gate line GL is arranged in parallel between pairs of adjacent pixel electrodes (first and second pixel electrodes) 11 in one line. The thin-film transistor 12 of the first pixel electrodes 11 is connected to the gate line GL adjacent to the first pixel electrode 11 and the thin-film transistor 12 of the second pixel electrode 11 is connected to the gate line GL adjacent to the second pixel electrode. Thus, the pixel electrode pairs are adjacent to each other with no gate line interposed therebetween. Further, the capacitor line CL overlaps two pixel electrodes 11 and the storage capacitors Cs are formed between the capacitor line CL and the pixel electrodes 11. In this structure, one capacitor line CL is common to the storage capacitors Cs of the two pixel electrodes 11.

Therefore, according to the above embodiment, the number of the capacitor lines required to respectively provide storage capacitors for pixel electrodes 11 is a half of the number of the pixel electrode columns (if the TFT panel has an even number of pixel electrode columns), or one plus a half of the number of the pixel electrode columns (if the TFT panel has an odd number of pixel electrode columns). Thus, capacitor lines substantially half as many as the pixel electrode columns suffice to respectively provide storage capacitors for pixel electrodes 11.

Although the TFT panel of the above embodiment has data lines twice as many as those in the conventional TFT panel (if the TFT panel of the invention has the same number of pixel electrodes as the conventional TFT panel), the total number of the gate lines GL and the data lines DL is the same as that in the conventional TFT panel, since the TFT panel of this embodiment has the gate lines of the number half that of the conventional TFT panel.

In the above TFT panel, although a gate line GL is provided between pairs of pixel electrode columns, it serves as a common line for simultaneously supplying a gate signal to the thin-film transistors 12 in the pixel electrode columns on both sides of the gate line GL, as described above. More specifically, the thin-film transistors in the pixel electrode columns on both sides of the gate line GL are connected to the gate line GL. Further, two data lines DL are arranged between two adjacent pixel electrode rows, such that the thin-film transistors 12 of the pixel electrode columns on one side of a gate line GL are connected to first data lines DL adjacent to first pixel electrode rows, and the thin film transistors 12 of the pixel electrode columns on the other side of the gate line GL are connected to second data lines DL adjacent to second pixel electrode rows. Thus, the thin-film transistors 12 of all the pixel electrodes 11 in the TFT panel can be driven.

In the active matrix liquid crystal display element using TFT panels as described above, the thin-film transistors 12 in two columns of the pixel electrodes are simultaneously turned on by supplying a gate signal (scanning signal) to the gate line GL between the pixel electrode columns. In synchronism with this operation, data signals from the two columns of the pixel electrodes are respectively supplied to the two data lines DL. Thus, the columns of the pixel electrodes are successively driven in a time-dividing manner.

Moreover, in the active matrix liquid crystal display element, since the thin-film transistors 12 in two columns of the pixel electrodes 11 are driven with one gate line GL, the apparent driving duty can be increased. Since the number of the data lines can be increased accordingly, it is possible to form a large-sized display screen.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A thin-film transistor panel comprising:

a transparent insulating substrate having a surface;

a plurality of transparent pixel electrodes arranged in a matrix on said surface of said insulating substrate;

a plurality of thin-film transistors positioned to respectively correspond to said pixel electrodes, and each of said thin-film transistors having gate, source and drain electrodes, one of said source and drain electrodes being connected to an associated one of said pixel electrodes;

gate lines formed between said pixel electrodes in pairs on said surface of said insulating substrate, each of said gate lines extending in a first direction of a row direction and a column direction of the matrix, and each of said gate lines being connected to the gate electrodes of the thin-film transistors arranged in the first direction;

data lines formed between said pixel electrodes on the one surface of said insulating substrate, each of said data lines extending in a second direction of the row direction and the column direction of the matrix, and each of said data lines being connected to the other of said source and drain electrodes of the thin-film transistors arranged in the second direction;

capacitor lines formed between two pairs of the pixel electrodes, extending in the first direction substantially in parallel with the gate lines, each of said capacitor lines facing a plurality of pixel electrodes including at least two pixel electrodes which are adjacent to each other in the second direction; and an insulating film provided between each of said capacitor lines and its facing at least two pixel electrodes such that a part of the capacitor line, a part of the at least two pixel electrodes an the insulating film, overlap each other and form storage capacitors;

wherein, each of said gate lines is provided between two pixel electrodes which are adjacent to each other in the second direction of the matrix, said gate lines extending in the first direction of the matrix, and said gate lines being connected to the gate electrodes of the thin-film transistors corresponding to the two adjacent pixel electrodes; and said data lines are arranged such that a row or column of said pixel electrodes is interposed between two data lines and are connected to every the other of said drain and source electrodes of said plurality of thin-film transistors corresponding to the pixel electrodes of each of said data lines.

2. A thin-film transistor panel according to claim 1, wherein each of said capacitor lines comprises a substantially straight transparent conductive line.

3. An active matrix liquid crystal display element comprising:

a first transparent insulating substrate having a surface;

a plurality of transparent pixel electrodes arranged in a matrix on said surface of said first transparent insulating substrate;

a plurality of thin-film transistors respectively connected to said pixel electrodes, each of said thin-film transistors having a source and a drain electrode, and one of said source and drain electrodes of each of said thin-film transistors being connected to each of said pixel electrodes;

gate lines formed between said pixel electrodes in pairs on said surface of said first transparent insulating substrate, each of said gate lines extending in a first direction of a row direction and a column direction of the matrix, and each of said gate lines being connected to the gate electrodes of the thin-film transistors arranged in the first direction;

data lines formed between said pixel electrodes on said surface of said first transparent insulating substrate, each of said data lines extending in a second direction of the row direction and the column direction of the matrix, and each of said data lines being connected to the other of said source and drain electrodes of the thin-film transistors arranged in the second direction;

capacitor lines formed between two pairs of the pixel electrodes, extending in the first direction substantially in parallel with the gate lines, each of said capacitor lines facing a plurality of pixel electrodes including at least two pixel electrodes which are adjacent to each other in the second direction through an insulating film, and said capacitor lines being arranged such that storage capacitors are formed between at least a part of the respective capacitor line and the at least two facing pixel electrodes which overlap each other with said insulating film therebetween;

a second transparent insulating substrate having a plurality of opposite electrodes which face said plurality of pixel electrodes, said second transparent insulating substrate being adhered to said first transparent insulating substrate by a sealing material; and a liquid crystal material sealed in a region enclosed by said first and second transparent insulating substrates and said sealing material;

wherein, each of said gate lines is provided between two pixel electrodes which are adjacent to each other in the row direction of the matrix, said gate lines extending in the column direction of the matrix, and said gate lines being connected to the gate electrodes of the thin-film transistors corresponding to the two adjacent pixel electrodes;

said data lines are arranged at both sides of a row of said pixel electrodes and are connected to every the other of said drain and source electrodes of said plurality of thin-film transistors corresponding to the pixel electrodes of each of said data lines; and said capacitor lines extend substantially in parallel with said gate lines, each of said capacitor lines overlapping two pixel electrodes which are adjacent to each other in a row direction of the matrix.

4. An active matrix liquid crystal display element according to claim 3, wherein each of said capacitor lines comprises a substantially straight transparent conductive line.

5. An active matrix liquid crystal display element according to claim 3, wherein each of said thin-film transistors is connected to an associated pixel electrode at one end thereof in the second direction, and each capacitor line faces the pixel electrodes at the other end of said associated pixel electrode in the second direction.

6. A thin-film transistor panel comprising:

a plurality of transparent pixel electrodes arranged in a matrix;

a plurality of thin-film transistors respectively corresponding to said pixel electrodes, and each thin-film transistor having gate, source and drain electrodes, one of said source and drain electrodes of each thin-film transistor being connected to a respective one of said pixel electrodes;

gate lines formed between two pairs of the pixel electrodes extending in a column direction of the matrix and connected to the gate electrodes of the thin-film transistors arranged in an associated column of the matrix;

data lines extending in a row direction of the matrix and connected to the other of said source and drain electrodes of the thin-film transistors arranged in an associated row of the matrix;

capacitor lines, each provided for two columns of the matrix and extending in the column direction of the matrix substantially in parallel with the gate lines but is not adjacent to these gate lines, each of said capacitor lines partially overlapping with the pixel electrodes arranged in an associated two columns; and insulating means arranged between said capacitor lines and the respective partially overlapping pixel electrodes for insulating said capacitor lines and said respective partially overlapping pixel electrodes from each other;

each of said capacitor lines and the pixel electrodes of an associated two columns facing each other to form storage capacitors; and wherein each of said plurality of gate lines is provided for an associated two columns of the matrix, and is connected to the gate electrodes of the thin-film transistors of the associated two columns.

7. A thin-film transistor panel according to claim 6, wherein each of said capacitor lines comprises a substantially straight transparent conductive line.

8. An active matrix liquid crystal display element comprising:

first and second transparent insulating substrates facing each other, the first and second transparent insulating substrates each having inner surfaces which face each other;

a plurality of transparent pixel electrodes arranged in a matrix on the inner surface of the first transparent insulating substrate;

a plurality of thin-film transistors formed on the inner surface of the first transparent insulating substrate, said thin-film transistors respectively corresponding to said pixel electrodes, and each thin-film transistor having gate, source and drain electrodes, one of said source and drain electrodes of each thin-film transistor being connected to a respective one of said pixel electrodes;

gate lines provided on the inner surface of the first transparent insulating substrate, said gate lines being formed between two pairs of the pixel electrodes and extending in a column direction of the matrix, and said gate lines being connected to the gate electrodes of said thin-film transistors which are arranged in an associated column of the matrix;

data lines, provided on the inner surface of the first transparent insulating substrate, said data lines extending in a row direction of the matrix, and said data lines being connected to the other of said source and drain electrodes of the thin-film transistors which are arranged in an associated row of the matrix;

capacitor lines provided on the inner surface of the first transparent insulating substrate, each capacitor line being provided for two columns of the matrix and each capacitor line extending in the column direction substantially in parallel with the gate lines but is not adjacent to these gate lines, each capacitor line partially overlapping with the pixel electrodes arranged in an associated two columns, and each of said capacitor lines and the pixel electrodes of the associated two columns forming storage capacitors;

insulating means arranged between said capacitor lines and the respective partially overlapping pixel electrodes for insulating said capacitor lines and said respective partially overlapping pixel electrodes from each other; and a liquid crystal material sealed in a region enclosed by said first and second transparent insulating substrates and a sealing material which adheres said first and second transparent insulating substrates to each other with said liquid crystal material therebetween; and wherein each of said plurality of gate lines is provided for an associated two columns of the matrix, and is connected to the gate electrodes of the thin-film transistors of the associated two columns.

9. An active matrix liquid crystal display element according to claim 8, wherein each of said capacitor lines comprises a substantially straight transparent conductive line.

* * * * *